Dec. 12, 1950 E. O. KEIZER 2,533,889
METHOD AND APPARATUS FOR DETERMINING TIME
FROM TARGET BY SIGNAL REFLECTION
Filed Nov. 30, 1946 3 Sheets-Sheet 1

INVENTOR.
Eugene O. Keizer
BY
ATTORNEY

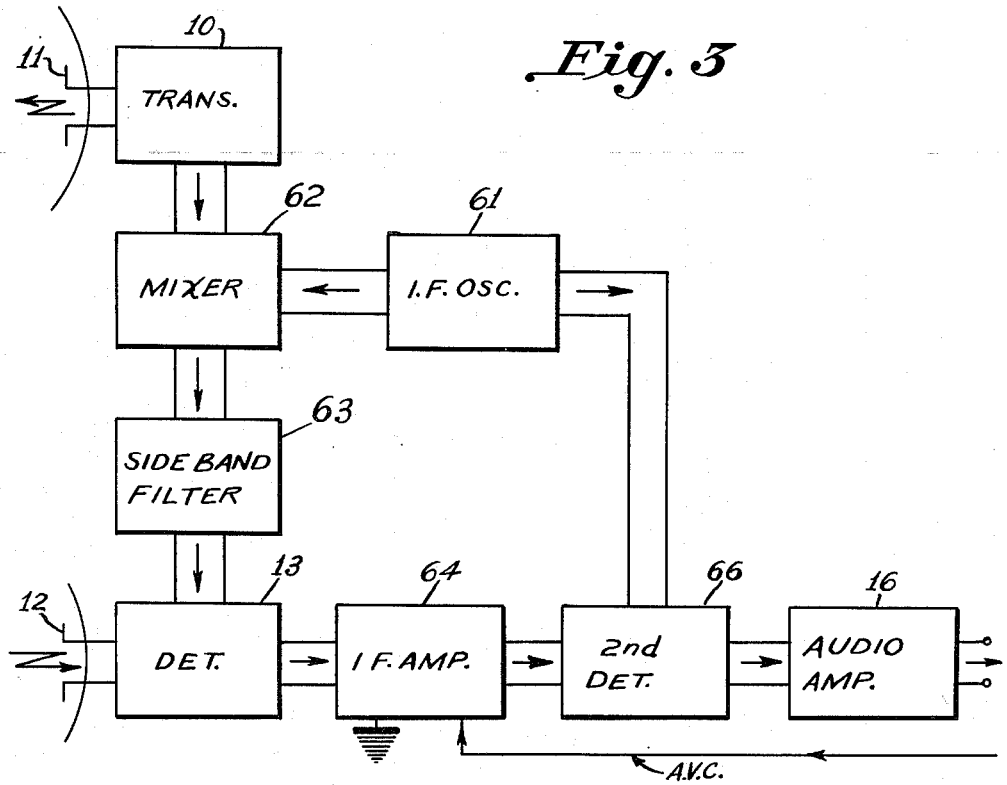
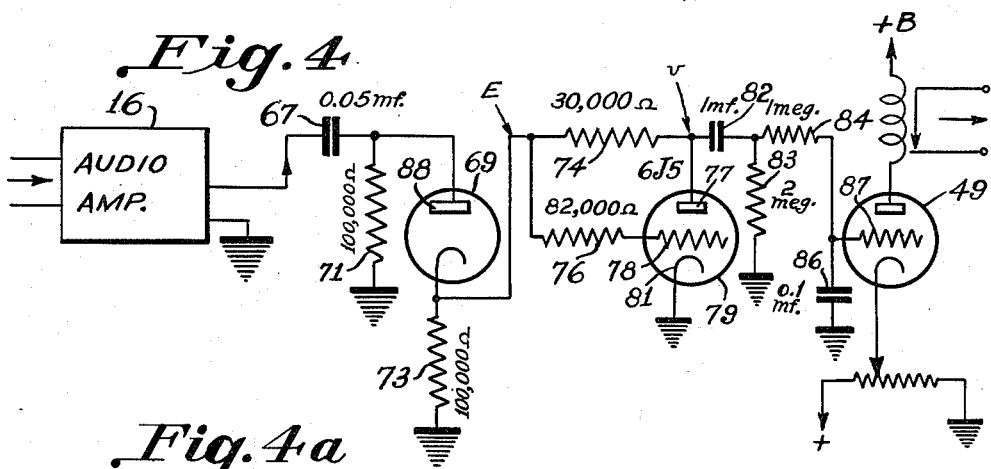
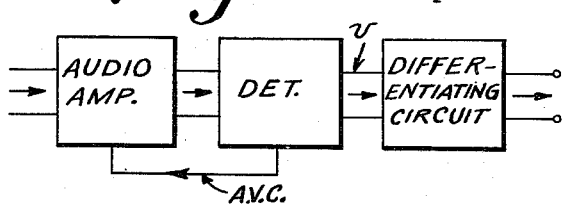

Dec. 12, 1950  E. O. KEIZER  2,533,889
METHOD AND APPARATUS FOR DETERMINING TIME
FROM TARGET BY SIGNAL REFLECTION
Filed Nov. 30, 1946  3 Sheets-Sheet 3

INVENTOR.
Eugene O. Keizer
BY
ATTORNEY

Patented Dec. 12, 1950

2,533,889

UNITED STATES PATENT OFFICE 2,533,889

METHOD AND APPARATUS FOR DETERMINING TIME FROM TARGET BY SIGNAL REFLECTION

Eugene O. Keizer, Princeton, N. J., assignor to Radio Corporation of America, a corporation of Delaware Application November 30, 1946, Serial No. 713,310

11 Claims. (Cl. 343—7)

My invention relates to radio apparatus for utilizing signal reflected from a target to determine the time required to reach the target and to a method of determining said time.

An object of the invention is to provide an improved means for and method of determining time from target.

A further object of the invention is to provide an improved means for and method of releasing a bomb or the like at the correct time for hitting a target.

According to one embodiment of the present invention an unmodulated radio carrier wave is radiated continuously toward a target and the reflected signal is mixed in a detector with carrier wave signal obtained directly from the transmitter whereby an audio beat frequency due to the Doppler effect is obtained. For the purpose of illustration it may be assumed that the apparatus comprising the transmitter, detector and other apparatus described hereinafter are located in an airplane that is approaching the target which may be a ship that is to be bombed.

Instead of relying on the Doppler effect to provide an audio frequency signal, it may be preferred to modulate the carrier wave with a continuous audio frequency signal such as a signal having a frequency of 3000 cycles per second. In this case, the modulating signal should have a frequency differing from the Doppler frequency by an amount sufficient to permit separation of the two audio frequencies by suitable filtering.

The audio frequency signal is supplied to apparatus that provides a signal output that is inversely proportional to the time required for the airplane to reach the target, hereinafter referred to as "time to target" and represented by T. The invention is based upon the fact that as the target is approached the ratio of the time rate of change of signal strength to signal strength is inversely proportional to T and is independent of the size of the target and is independent of the speed of approach to the target. The speed of approach, however, should be constant.

That the said ratio is proportional to $$\frac{1}{T}$$

may be shown as follows:

$$E=\frac{K}{D^2}$$

where E equals the field strength of the reflected signal at the airplane carrying the apparatus, K is a constant depending upon the radio transmitter and the target, and D is the distance from the airplane to the target. Then $$\frac{dE}{dD}=\frac{-2K}{D^3}=\text{rate of change of signal strength versus distance}$$

$$\frac{\frac{dE}{dD}}{E}=\frac{-2K}{D^3}\cdot\frac{D^2}{K}=\frac{-2}{D}=\text{proportionate rate of change of signal strength versus distance}$$

$$S=\frac{dD}{dt}$$

where S is the speed of approach to the target. Then multiplying above equation by S $$\frac{\frac{dE}{dD}}{E}\cdot S=\frac{-2S}{D}$$

or $$\frac{\frac{dE}{dD}\cdot\frac{dD}{dt}}{E}=\frac{-2S}{D}$$

or $$\frac{\frac{dE}{dt}}{E}=\frac{-2S}{D}=\text{percent change of voltage in a given time}$$

If speed is constant, $D=ST$ and $$\frac{\frac{dE}{dt}}{E}=\frac{-2S}{ST}=\frac{-2}{T}$$

Thus it has been shown that the per cent change of voltage in a given time equals a constant time 1/T. Apparatus for obtaining an output equal to $$\frac{\frac{dE}{dt}}{E}$$

will now be described with reference to the accompanying drawing in which:

Figure 3 is a block diagram illustrating another embodiment of the invention,

Figure 1:
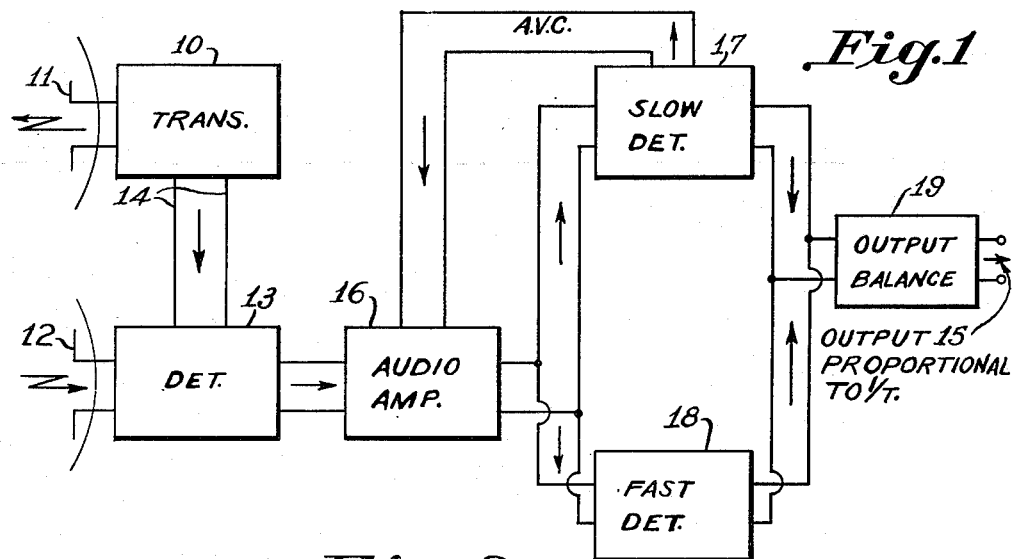
Figure 1 is a block diagram illustrating one embodiment of the invention.
Figure 2:
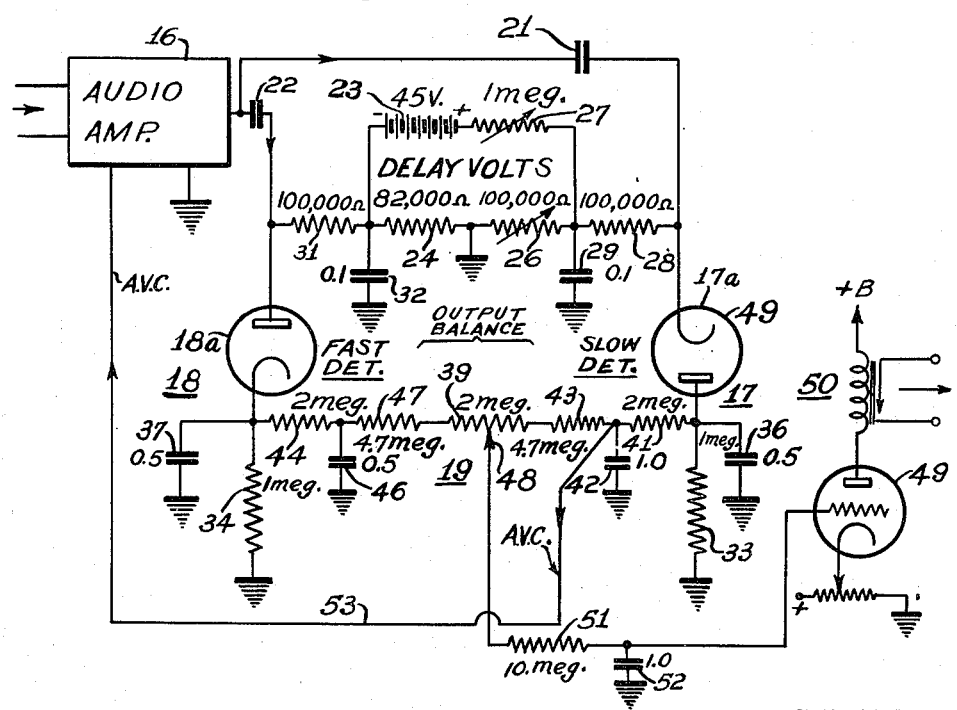
Figure 2 is a circuit diagram of a portion of the apparatus shown in Fig. 1.
Figure 5:
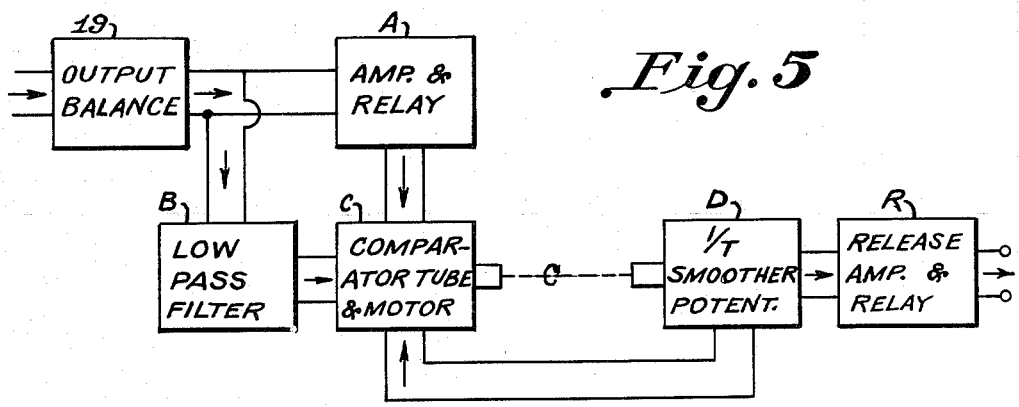
Figure 6:
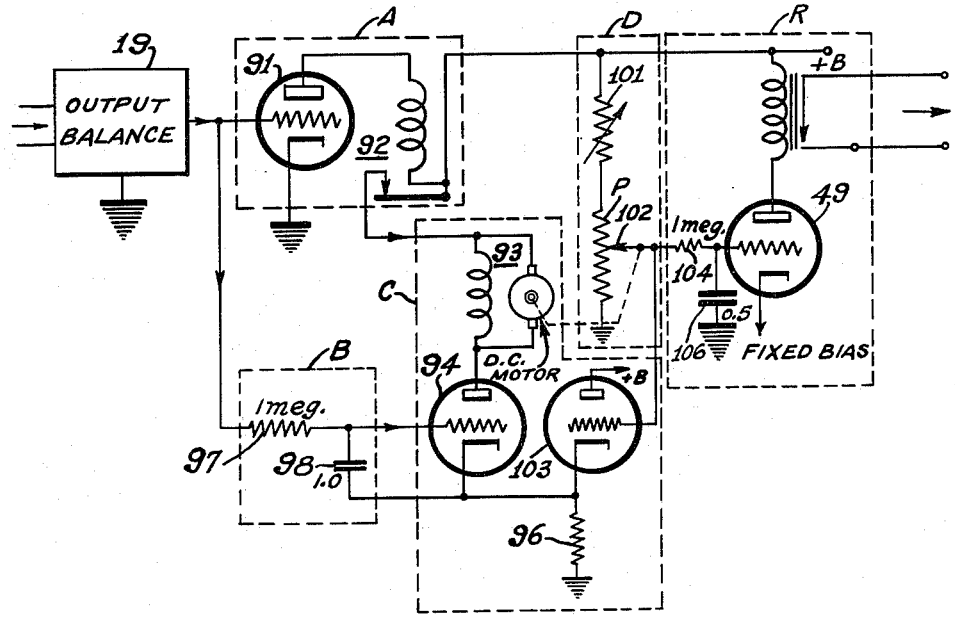
Figure 7:
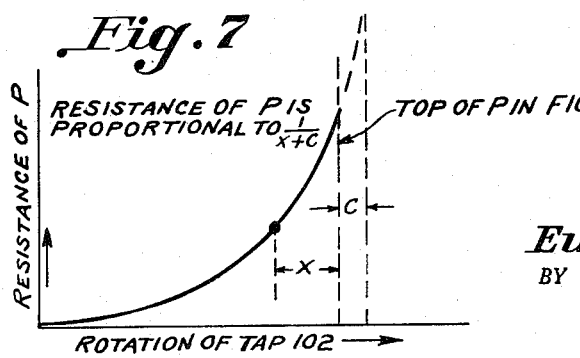

Figures 4 and 4a are circuit and block diagrams, respectively, illustrating embodiments of the invention that may be substituted for the apparatus shown in Fig. 2, Figure 5 is a block diagram of apparatus that may be employed with apparatus such as shown in Fig. 1 for improving the operation in the event of signal fading, Figure 6 is a circuit diagram of the apparatus shown in Fig. 5, and Figure 7 is a graph that is referred to in explaining the operation of the apparatus shown in Figs. 5 and 6.

In the several figures, similar parts are indicated by similar reference characters.

Referring to Fig. 1, there is shown a radio transmitter 10 that radiates continuously an unmodulated carrier wave from a suitable antenna 11. This wave is reflected from the target or other reflecting object and is picked up by an antenna 12 and supplied to a detector 13 where it beats with signal supplied over leads 14 from the transmitter 10. The resulting beat frequency signal is amplified by an audio frequency amplifier 16.

Referring to Fig. 1 and Fig. 2, signal from the amplifier 16 is supplied to a detector 17 having a slow time constant and also to a detector 18 having a comparatively fast time constant. Automatic gain control or A. V. C. signal is applied from the slow detector 17 to the audio frequency amplifier 16. The outputs of detectors 17 and 18 are supplied to an output balance circuit 19 which, for reasons explained hereinafter, has an output that is equal to the percentage change of voltage in a given time which is expressed mathematically as $$\frac{\frac{dE}{dt}}{E}$$

As shown in Fig. 2, the detectors 17 and 18 comprise diodes 17a and 18a that are oppositely connected so that their outputs are of opposite polarity. Signal is applied from amplifier 16 through coupling capacitors 21 and 22 to the diodes 17a and 18a, respectively. Delay voltage for the detectors may be supplied from a voltage source 23 that has resistors 24 and 26 connected thereacross, the voltage applied across resistors 24 and 26 being adjustable by means of a variable resistor 27. The voltage applied to the diodes is further adjustable by means of variable resistor 26.

The junction point of resistors 24 and 26 is grounded. Delay voltage is applied from the ungrounded end of resistor 26 to the cathode of diode 17a through a filter comprising a resistor 28 and a capacitor 29. Similarly, delay voltage is applied from the ungrounded end of the resistor 24 to the anode of diode 18a through a filter comprising a resistor 31 and a capacitor 32.

The diode 17a has an output resistor 33 connected between its anode and ground while the diode 18a has an output resistor 34 connected between its cathode and ground. Resistors 33 and 34 are shunted by capacitors 36 and 37, respectively.

The negative polarity output signal of the diode 17a is applied to one end of a resistor 39 of the balance circuit 19 through a comparatively slow time constant filter comprising a resistor 41 and a capacitor 42 and through a resistor 43. The positive polarity output signal of the diode 18a is applied to the other end of the balance resistor 39 through a comparatively fast time constant filter comprising a resistor 44 and a capacitor 46 and through a resistor 47. An adjustable tap 48 on the balance resistor 39 is connected to the grid of a vacuum tube 49 through a filter comprising a resistor 51 and a capacitor 52. A relay 50 is actuated when the voltage at tap 48 reaches a predetermined value, that is, when $$\frac{\frac{dE}{dt}}{E}$$

reaches said predetermined value.

The tap 48 is adjusted to a point of zero voltage with respect to ground for the condition of equal voltage output from the diodes 17a and 18a. For the purpose of this adjustment, an unchanging signal is applied to the audio amplifier. In Fig. 2, circuit values are indicated in megohms and microfarads merely by way of example.

When the distance between the radio equipment and the target is changing, there will be a voltage at the tap 48 equal to $$\frac{\frac{dE}{dt}}{E}$$

because of the A. V. C. connection 53 from the slow time constant filter 41, 42 to the audio amplifier 16. If, for example, an airplane carrying the equipment is approaching a target, the signal supplied to the amplifier 16 will be increasing in amplitude. Although the A. V. C. will tend to hold the output of the amplifier 16 at a constant value this A. V. C. control will lag the increase in the strength of input signal at the amplifier 16. Since there is less time lag in the fast detector 18 than in the slow detector 17, the voltage applied from detector 18 to the balance resistor 39 will be of greater amplitude than the voltage applied from detector 17 to the resistor 39, and the more rapid the increase in signal strength, the greater will be the difference in the two voltages. Therefore, a positive voltage appears at tap 48 and, as will now be shown, this voltage equals $$\frac{\frac{dE}{dt}}{E}$$

Assuming a good or substantially flat A. V. C. and the use of a delay voltage:

$Vi$ = instantaneous audio output.

$\overline{Vi}=Vi$ averaged over the time constant of the slow detector.

Also, $\overline{Vi}=K$ for steady input voltage to the audio amplifier or for very slow changes in input, such as very slow fading, and for changes of the order of the time constant of the slow detector.

$\overline{E}$ = received signal strength substantially averaged over the period of the time constant of the slow detector.

$E$ = instantaneous received signal strength.

$G$ = gain of audio amplifier.

$$\overline{Vi}=K=\overline{E}G$$

$$G=\frac{K}{\overline{E}}$$

$$Vi=GE=E\times\frac{K}{\overline{E}}$$

Fast detector output is proportional to $$Vi=K'Vi$$

Slow detector output is proportional to $$\overline{Vi}=K''\overline{Vi}$$

Total output=fast detector output minus slow detector output, or

Total output$=K'Vi-K''\overline{V}i=K'\dfrac{EK}{\overline{E}}-K''\dfrac{\overline{E}K}{\overline{E}}$ Let $E=\overline{E}\pm p\overline{E}=(1\pm p)\overline{E}$ where $p\times 100$=percentage change of input voltage in a given time.

Total output$=\dfrac{K'K(1\pm p)\overline{E}}{\overline{E}}-\dfrac{K''K\overline{E}}{\overline{E}}$ Let $K'=K''$. Then Total output$=\dfrac{K''K\overline{E}}{\overline{E}}\pm\dfrac{pK''K\overline{E}}{\overline{E}}-\dfrac{K''K\overline{E}}{\overline{E}}=\pm pK''K$ Since $p\times 100$=percentage change of input voltage in a given time, it follows that $$\pm pK''K=\dfrac{\dfrac{dE}{dt}}{E}$$

of first mathematical development.

It is apparent, referring to the equation $$\dfrac{\dfrac{dE}{dt}}{E}=-\dfrac{2}{T}$$

that the voltage output is inversely proportional to the time required to reach the target.

As shown in Figure 3, the invention may be applied to a superheterodyne type of system, a system of this general type being described in Chaffee Re. 21,955, November 25, 1941. In this type of system an oscillator 61 operating at the desired intermediate frequency supplies signal to a mixer 62 where it is mixed with signal from the transmitter 19. The resulting signal, which includes upper and lower side bands, is supplied to a side-band filter 63 which supplies one of the side-band signals only to the detector 13. The side-band signal and the received signal mix in the detector 13 to produce a signal having the desired intermediate frequency, and this signal is amplified by an I.-F. amplifier 64.

The amplified I.-F. signal is supplied to a second detector 66 where it is mixed with signal from the I.-F. oscillator 61 to produce the beat frequency signal. This method of detecting the beat frequency signal in a system of this type is described and claimed in application Serial No. 507,221, filed October 20, 1943, now Patent No. 2,466,532, issued April 5, 1949, in the name of W. L. Carlson. The signal from detector 66 is supplied to the audio frequency amplifier 16.

In this system as shown in Figure 3, the A. V. C. signal from the slow detector 17 (Figure 1) is applied to the I.-F. amplifier 64 to control its gain. The operation for determining time from target is the same as previously described, the apparatus which follows the audio amplifier 16 being the same as shown in Figure 2, for example.

It should be understood that while the system of the present invention may be installed on aircraft and used for automatically releasing bombs at the proper time to hit a target, for example, the use of the invention is not so limited. For instance, the apparatus may be installed on the ground and the radio wave directed toward an approaching aircraft or missile from which the wave is reflected. This may be useful in directing the blind landing of an aircraft, for example.

Also, the apparatus may be installed in a guided missile to provide "time from target" information for its control.

Figure 4 shows a simplified circuit that may be employed in place of the one shown in Figure 2. In this circuit no A. V. C. is employed for the audio amplifier 16. The output of amplifier 16 is applied through a capacitor 67 to the anode 68 of a diode detector tube 69. A leak resistor 71 is connected between the anode 68 and ground, and an output resistor 72 is connected between the diode cathode 73 and ground.

The detector 69 may be a peak voltage detector, for example, although it need not be of this type. However, the time constant of the detector must be long enough for good detector action but short enough so that the detector output follows the signal strength change due to the changing distance between the aircraft and the target.

The detector output of voltage E is applied through resistors 74 and 76 to the anode 77 and the grid 78, respectively, of a triode 79 which in the example is of the 6J5 type. The cathode 81 of triode 79 is grounded.

The signal voltage $v$ at the anode 77 is proportional to the logarithm of the total applied signal. This result can be obtained by a method of cut and try using different circuit values and different type tubes. The circuit example illustrated was found satisfactory. It will be noted that the resistor 74 and the cathode-anode impedance of the tube 79 are in series with each other to form a potentiometer connected across the diode output resistor 73. It will also be noted that as the positive signal voltage E increases in value, the said cathode-anode impedance is decreased. It is the voltage appearing across said cathode-anode impedance, i. e., the voltage $v$ that is applied through a differentiating circuit and filter to the relay tube 49.

The differentiating circuit comprises a capacitor 82 and a resistor 83 connected in series with each other and between the anode 77 and ground. The resulting signal appearing across resistor 83 is $$\dfrac{\dfrac{dE}{dt}}{dE}$$

and therefore is a constant times $$\dfrac{1}{T}$$

as previously explained. This signal is applied by way of a filter comprising a resistor 84 and a capacitor 86 to the grid 87 of the relay tube 49. The filter 84, 86 is provided to prevent sudden signal changes, such as those due to noise, from affecting the circuit operation.

The differentiated signal is the desired signal because $v=\log E$ as previously explained. Therefore, $$\dfrac{dv}{dt}=\dfrac{1}{E}\dfrac{dE}{dt}=\dfrac{\dfrac{dE}{dt}}{E}$$

Therefore, the output of the differentiating circuit 82, 83 is the voltage that has been shown to be equal to a constant times the reciprocal of the time T from target.

In Figure 4 certain circuit values are given in ohms, megohms and microfarads merely by way of example.

The invention is not limited to the use of the circuit 74, 76, 79 for obtaining the log of the voltage E. For example, the value $v=\log E$ may be obtained by employing an ordinary amplifier provided with a fast-acting automatic volume control circuit and without any zero delay voltage. In this case as shown in Figure 4a, the said amplifier is followed by a detector which feeds directly into a differentiating circuit to produce the value $$\frac{\frac{dE}{dt}}{E}$$

Figures 5 and 6 show in block and circuit diagram, respectively, apparatus for minimizing the effect of signal fluctuations or fading. Instead of the $$\frac{\frac{dE}{dt}}{E}$$

signal being applied directly to the grid of the relay tube 49 as in Figures 2 and 4, it is applied by way of an amplifier tube and relay unit A and a low pass filter B to a comparator tube and motor circuit C which in turn controls a smoother potentiometer D that supplies the voltage corresponding to $$\frac{1}{T}$$

to the grid of relay tube 49 of the release amplifier and relay unit R.

Referring more specifically to the circuit diagram of Figure 6, the unit A comprises an amplifier tube 91 having the coil of a relay 92 connected in its anode circuit. The tube 91 and relay 92 are adjusted so that the armature of relay 92 pulls up to close the circuit of a motor 93 in the unit C at some time before the release relay unit R is to be actuated.

The unit C includes, in addition to the motor 93, an amplifier tube 94 which has its cathode-anode impedance in series with the motor 93. When the armature of relay 92 is pulled up, the motor circuit is closed. This circuit may be traced from the +B terminal through the relay armature, the motor 93, the tube 94, and through a cathode resistor 96 to ground.

The filter B comprises a series resistor 97 and a shunt capacitor 98. The grid and cathode of the tube 94 are connected to opposite sides of the capacitor 98 whereby the direct-current charge on capacitor 98 tends to make the grid of tube 94 more positive as the signal from the unit 19 increases in amplitude.

The smoother potentiometer D comprises a resistor 101 and a resistor P connected between +B and ground. The resistor P has a variable tap 102 which is mechanically coupled to the motor 93. The potentiometer resistor P is wound to have the characteristic shown in Figure 7.

The tap 102 is connected electrically to the grid of a cathode follower tube 103 that has the resistor 96 in its cathode circuit. The cathode of the tube 94 is connected to the cathode of the tube 103 whereby the cathode bias of tube 94 with respect to ground is determined by the position of the tap 102. It will be apparent that the impedance of the tube 94, and, therefore, the current through the motor 93, is controlled both by the position of the tap 102 and the amplitude of the output of the filter B.

The tap 102 is also electrically connected to the grid of the relay amplifier tube 49, preferably through a filter resistor 104 which, with a filter capacitor 106, reduces any noise voltage fluctuations at said grid.

The circuit operation is as follows:

Assume that an aircraft carrying the apparatus of the invention is approaching a target, that the relay 92 has been closed and that there is no fading or fluctuation of the received signal. Then the grid of the tube 94 has an increasingly positive voltage applied to it through the filter resistor 97, and, also, the cathode of the tube 94 has an increasingly positive voltage applied to it since the motor is running and driving the tap 102 toward the top of the potentiometer resistor P. The circuit adjustment and the resistance winding of resistor P are such that, for the assumed condition, the grid and cathode of tube 94 increase positively by the same amount whereby there is no voltage difference appearing across the capacitor 98.

Assume now that the signal fades away for a period less than the one second time constant of the filter B. Then the motor 93 will continue to run and cause the voltage 102 to become increasingly positive. Therefore, the release relay R will be operated at substantially the correct time even if the signal fades away just before the correct release time. There will be a slight error in this case because the cathode of the tube 94 will become slightly positive with respect to the grid so as to increase the tube impedance and slow the motor down some. However, this is a minor error as compared with the one that would result in the absence of the motor actuated smoothing circuit.

Where the received signal is fluctuating, its mean or average value may be taken as the correct value and the one at which the voltages on the grid and cathode of the tube 94 would change like amounts. Assume the signal voltage is above this average value for a period of a half second, for example. Then the grid of tube 94 becomes positive with respect to the cathode, the impedance of the tube 94 is decreased, and the motor 93 runs faster. On the negative half cycle of the signal fluctuation, on the other hand, the motor 93 slows down some. The result is an averaging action which results in the potential at the tap 102 always being at much more nearly the correct value than is the instantaneous potential of the fluctuating signal itself. Consequently, the errors in the time of actuation of the release relay are substantially reduced.

In Figure 6 certain circuit values are indicated in ohms and microfarads merely by way of example.

I claim as my invention:

1. The method of determining the time required for two relatively moving objects to meet where their speed of approach is constant which comprises continuously radiating a radio wave from one of said objects toward the other object whereby said wave is reflected back to said one object with a field strength E at said one object, and deriving at said one object the value $$\frac{\frac{dE}{dt}}{E}$$

whereby the value $$\frac{1}{T}$$

is determined where T is the time required for said objects to meet.

2. Apparatus for determining the time required for two relatively moving objects to meet where their speed of approach is constant which comprises means for continuously radiating a radio wave from one of said objects toward the other object whereby said wave is reflected back to said one object with a field strength E at said one object, and means for determining at said one object the value $$\frac{\frac{dE}{dt}}{E}$$

whereby the value $$\frac{1}{T}$$

is determined where T is the time required for said objects to meet.

3. The method of determining the time required for an object such as an aircraft or missile to reach a target which comprises the steps of moving said object toward said target at a constant speed, continuously radiating a radio wave toward said target whereby it is reflected back to said object with a field strength E at said object, and deriving at said object the value $$\frac{\frac{dE}{dt}}{E}$$

whereby the value $$\frac{1}{T}$$

is determined where T is the time required for the object to reach the target.

4. Apparatus for installation in an object such as an aircraft or missile for determining the time required for said object to reach a target that it is approaching at constant speed, said apparatus comprising means for continuously radiating a radio wave toward said target whereby said wave is reflected back to said object with a field strength E at said object, means for receiving said reflected wave, and means for producing from said received wave a voltage having the value $$\frac{\frac{dE}{dt}}{E}$$

whereby the value $$\frac{1}{T}$$

is determined where T is the time required for said object to reach said target.

5. The invention according to claim 2 wherein said means for determining the value $$\frac{\frac{dE}{dt}}{E}$$

comprises an amplifier, a detector having a comparatively slow time constant, a detector having a comparatively fast time constant, means for supplying the output of said amplifier to each of said detectors, an automatic gain control circuit for said amplifier, said gain control circuit comprising a connection from the output circuit of said slow-time-constant detector to said amplifier, and means for connecting the output circuits of said two detectors in voltage opposition whereby the resulting output is a voltage equal to $$\frac{\frac{dE}{dt}}{E}$$

6. The invention according to claim 2 wherein said means for determining the value $$\frac{\frac{dE}{dt}}{E}$$

comprises means for producing a voltage $v$ when the voltage E is applied to said means where $v$ is defined by the equation $v = \log E$, and further comprising means for differentiating the voltage $v$ to obtain the voltage defined by the equation $$\frac{dv}{dt} = \frac{1}{E}\frac{dE}{dt}$$

7. Apparatus to which a signal having a voltage E is to be applied, said apparatus comprising an amplifier followed by a detector, a fast-acting automatic volume control circuit for said amplifier, said control circuit including a connection from said detector to said amplifier, said controlled amplifier having the characteristic that the voltage output $v$ of said detector is given by the equation $v = \log E$, and means for differentiating the voltage $v$ to obtain the voltage defined by the equation $$\frac{dv}{dt} = \frac{1}{E}\frac{dE}{dt}$$

8. The invention according to claim 2 wherein said means for determining the value $$\frac{\frac{dE}{dt}}{E}$$

comprises an amplifier followed by a detector, a fast-acting automatic volume control circuit for said amplifier, said control circuit including a connection from said detector to said amplifier, said controlled amplifier having the characteristic that the voltage output $v$ of said detector is given by the equation $v = \log E$, and means for differentiating the voltage $v$ to obtain the voltage defined by the equation $$\frac{dv}{dt} = \frac{1}{E}\frac{dE}{dt}$$

9. Apparatus to which a signal having a volttage E is to be applied, said apparatus comprising a triode having a cathode, a control grid and an anode, said anode being connected through a resistor to an input terminal, said control grid being connected through a second resistor to said input terminal, means for applying said signal between said terminal and said cathode, the characteristic of said tube and the values of said resistors being such that the voltage $v$ at said anode is given by the equation $v = \log E$, and means for differentiating the voltage $v$ to obtain the voltage defined by the equation $$\frac{dv}{dt} = \frac{1}{E}\frac{dE}{dt}$$

10. In combination, apparatus installed in an aircraft for determining the time required for said aircraft to reach a target that it is approaching at constant speed, said apparatus comprising means for continuously radiating a radio wave toward said target whereby said wave is reflected back to said aircraft with a field strength E at said aircraft, means for receiving said reflected wave, means for producing from said received wave a time-from-target voltage having a value equal to $$\frac{\frac{dE}{dt}}{E}$$

and which is a measure of the time required for said aircraft to reach said target, and signal smoothing apparatus comprising a potentiometer resistor having a variable tap thereon from which a control voltage may be taken, a motor coupled to said tap to move it along said potentiometer resistor, said resistor having the characteristic that its resistance $$R=\frac{1}{x+c}$$

where $c$ is a constant and where $x$ is the distance of the tap from its final position when said aircraft reaches said target, a vacuum tube having a cathode, at least one control grid and an anode, a power supply connected to said motor through the cathode-anode impedance of said tube, a filter comprising a series resistor and a shunt capacitor and having a time constant that is longer than the received signal fluctuations that are to be smoothed out, means for applying said time-from-target voltage to a control grid of said tube by way of said filter, the capacitor of said filter being connected between said grid and said cathode, means comprising a connection from said potentiometer tap to an electrode of said tube for changing the cathode-anode impedance of said tube in a sense opposite to the change in said impedance produced by the voltage from said filter, and a relay circuit connected to said potentiometer tap for operating in response to a predetermined voltage on said tap.

11. In combination, apparatus installed in an aircraft for determining the time required for said aircraft to reach a target that it is approaching at constant speed, said apparatus comprising means for continuously radiating a radio wave toward said target whereby said wave is reflected back to said aircraft, means for receiving said reflected wave means for producing from said received wave a time-from-target voltage having a value that is a measure of the time required for said aircraft to reach said target, and signal smoothing apparatus comprising a potentiometer resistor having a variable tap thereon from which a control voltage may be taken, a motor coupled to said tap to move it along said potentiometer resistor, a vacuum tube having a cathode, a control grid and an anode, a power supply connected to said motor through the cathode-anode impedance of said tube, a filter comprising a series resistor and a shunt capacitor and having a time constant that is longer than the received signal fluctuations that are to be smoothed out, means for applying said time-from-target voltage to said control grid by way of said filter, the capacitor of said filter being connected between said grid and said cathode, said cathode being connected through a cathode resistor to ground, a second vacuum tube having a cathode connected to the cathode of said first tube and having a control grid connected to said potentiometer tap and also having an anode connected directly to a positive voltage source, and a relay circuit connected to said potentiometer tap for operating in response to a predetermined voltage on said tap.

EUGENE O. KEIZER.

REFERENCES CITED

The following references are of record in the file of this patent:

UNITED STATES PATENTS

| Number | Name | Date |
|---|---|---|
| 1,728,311 | Taylor | Sept. 17, 1929 |
| 1,931,866 | Heising | Oct. 24, 1933 |
| 2,099,536 | Scherbatskoy | Nov. 16, 1937 |
| 2,313,098 | Shepard | Mar. 9, 1943 |
| 2,367,116 | Goldsmith | Jan. 9, 1945 |
| 2,462,856 | Ginzton | Mar. 1, 1949 |
| 2,496,259 | Bachmann | Feb. 7, 1950 |